Figure 1:
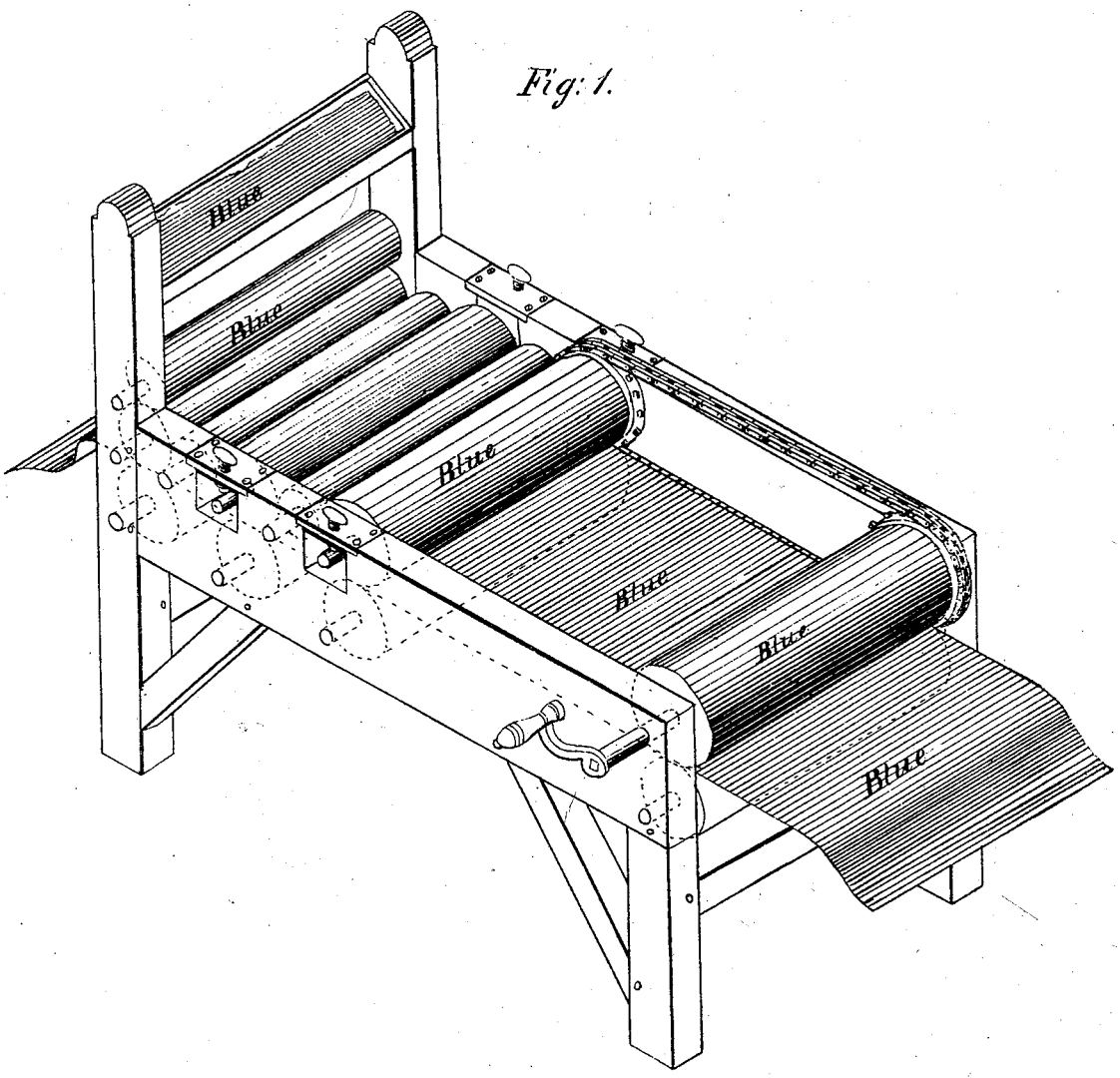
Figure 2:
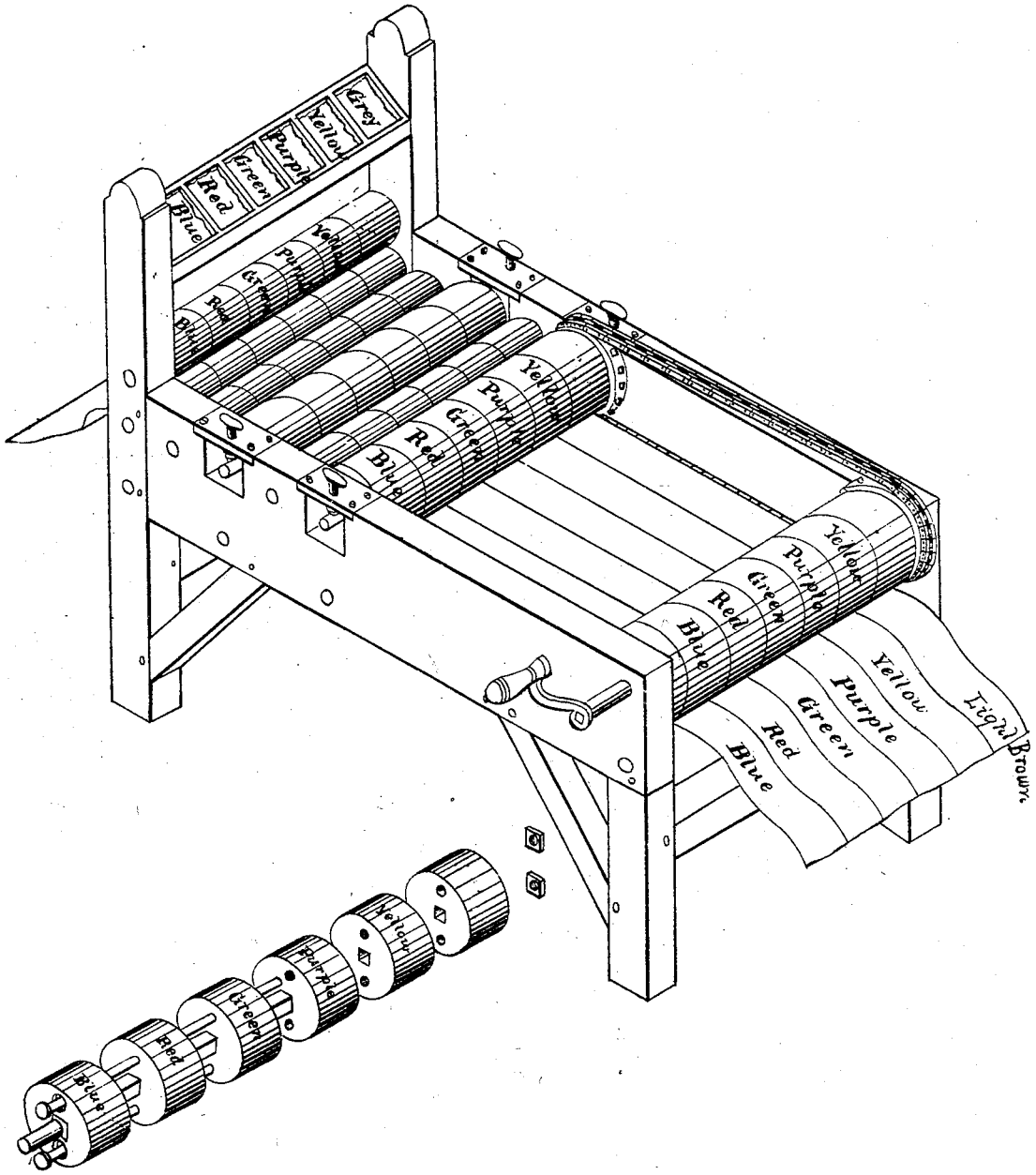
Figure 3:
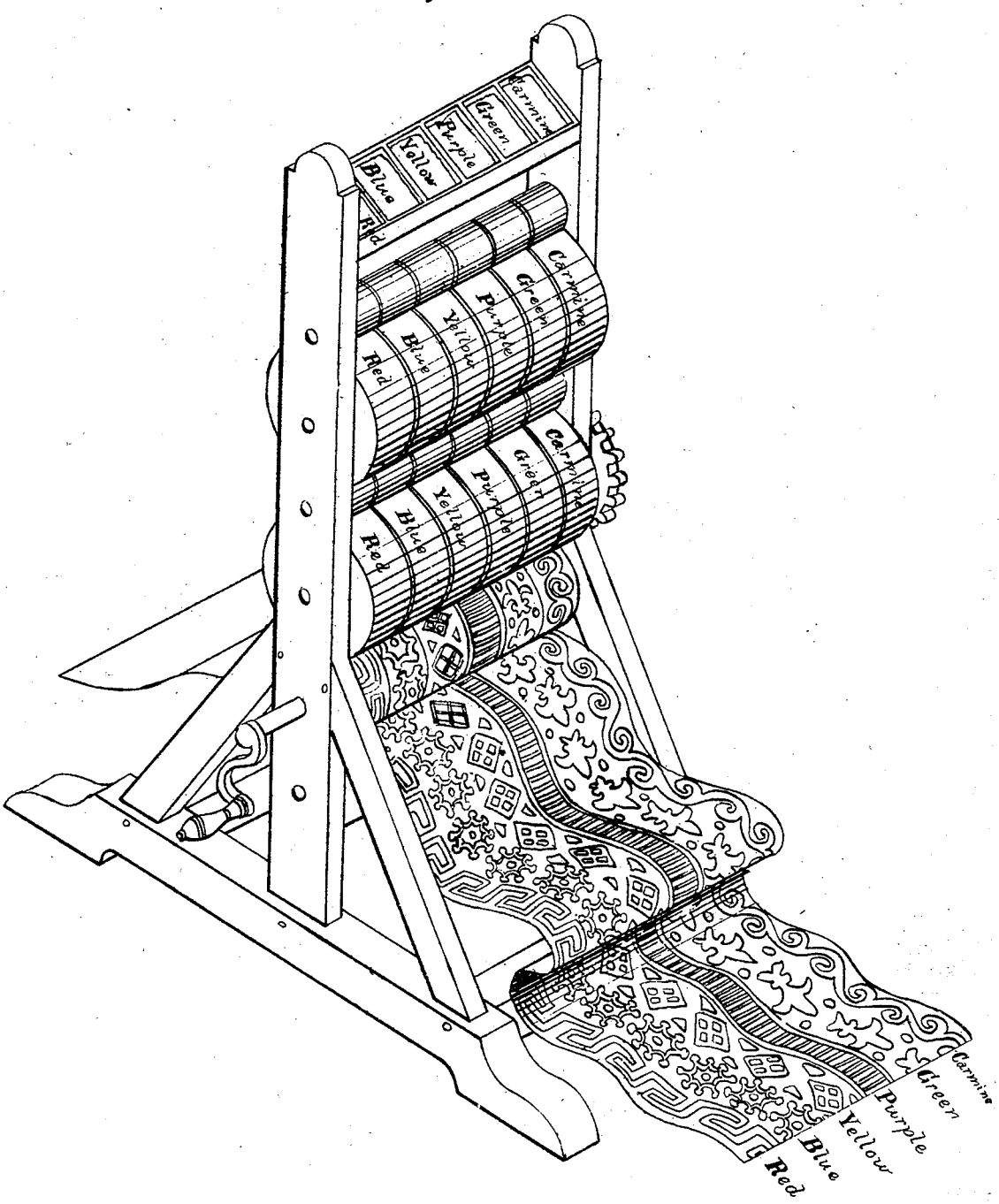
Figure 4:
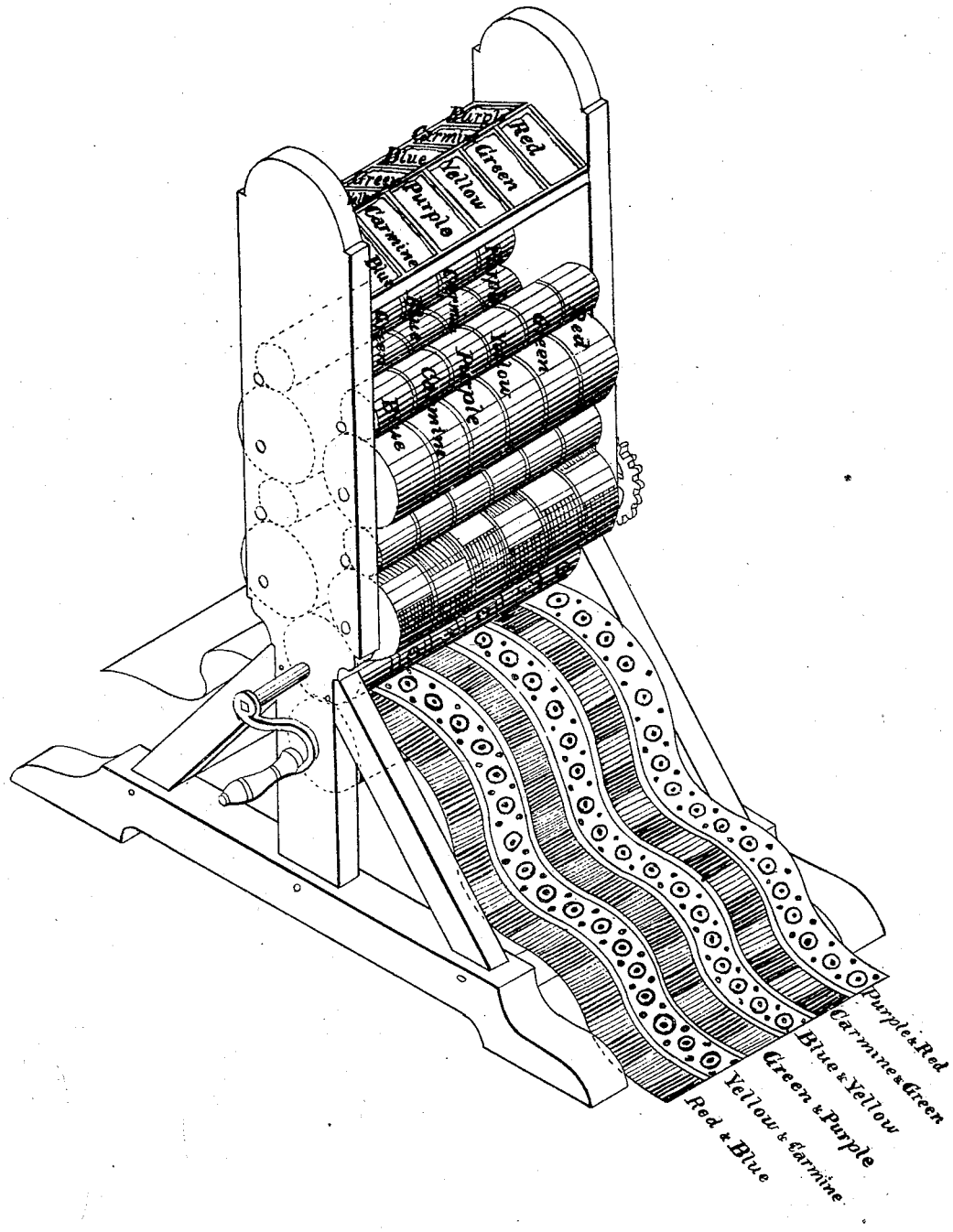
Figure 5:
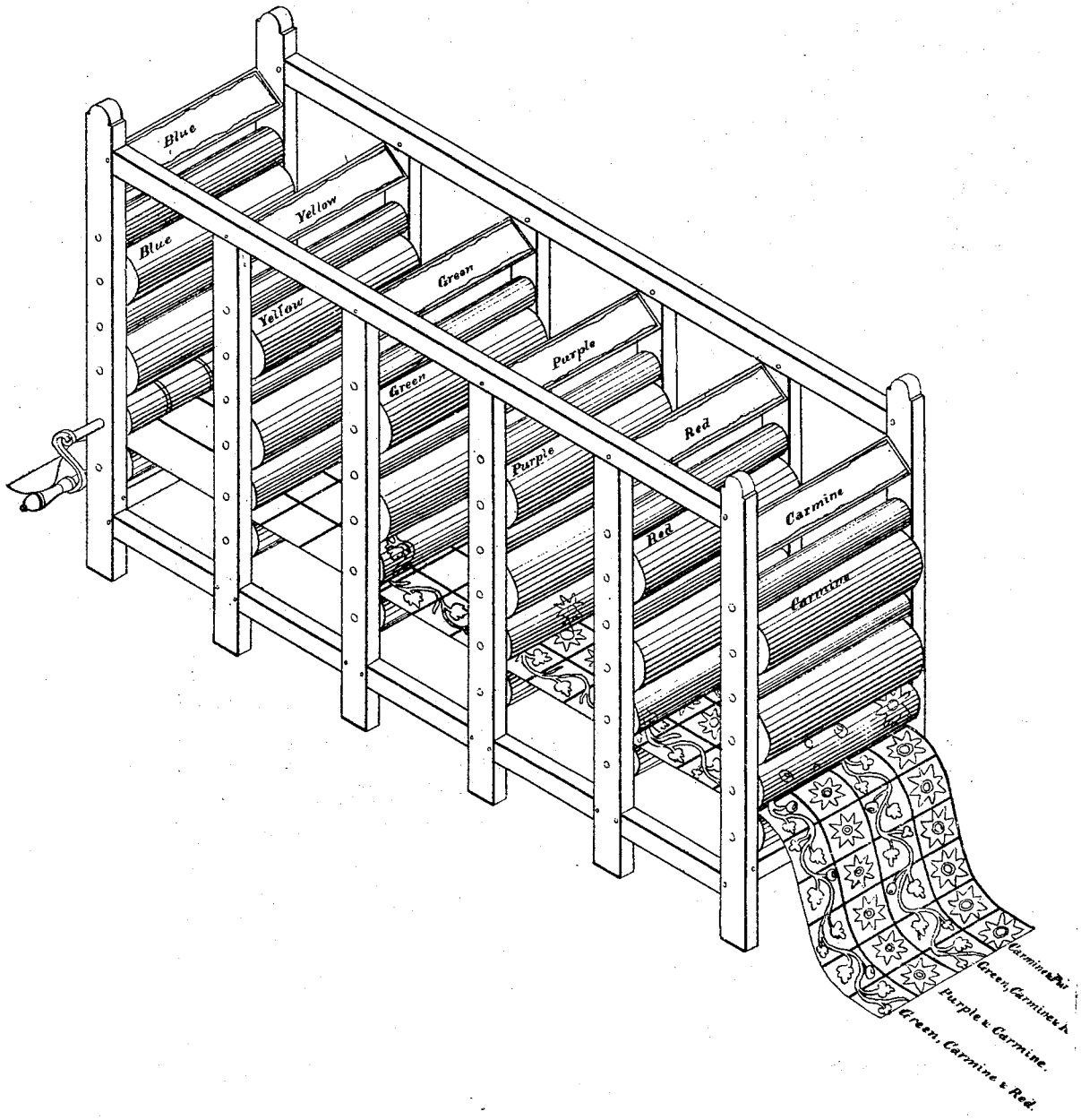
Figure 6:
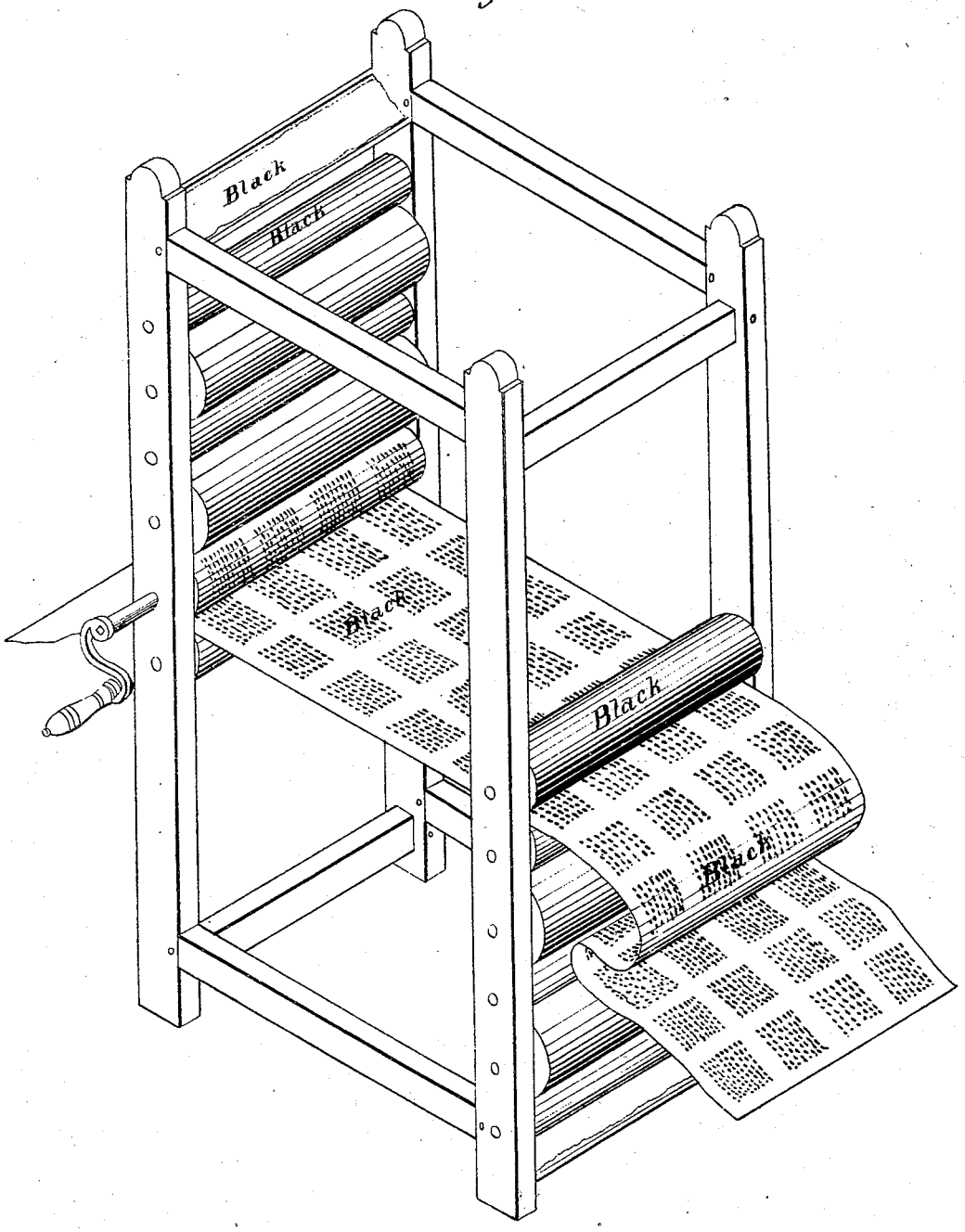

3573X

NO PRINTED SPECIFICATION AVAILABLE

P. Force. Sheet 1. 6 Sheets.

Color Printing.

No. Patented Aug. 22, 1822.

3573X NO PRINTED SPECIFICATION AVAILABLE

P. Force. Sheet 2. 6 Sheets.

Color Printing.

JVo

Patented Aug. 22, 1822.

3573X

NO PRINTED SPECIFICATION AVAILABLE

P. Force. Sheet 3, 6 Sheets.

Color Printing.

No

Patented Aug. 22, 1822.

3573X NO PRINTED SPECIFICATION AVAILABLE

P. Force. Sheet 4. 6 Sheets.

Color Printing.

No. Patented Aug. 22, 1822.

3573X

NO PRINTED SPECIFICATION AVAILABLE

P. Force. Sheet 5. 6 Sheets.

Color Printing.

No. Patented Aug. 22. 1822.

3573X

NO PRINTED SPECIFICATION AVAILABLE

P. Force. Sheet 6, 6 Sheets.

Color Printing.

No. Patented Aug. 22. 1822

United States Patent Office

PTO - BOYERS, PA Duty Station

MISSING PAGE TEMPORARY NOTICE

PATENT # 3573X FOR ISSUE DATE 10-15-1822

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa